(12) United States Patent
Gieras

(10) Patent No.: US 10,916,997 B2
(45) Date of Patent: Feb. 9, 2021

(54) LINE START TWO-SPEED BRUSHLESS MOTOR

(71) Applicant: Hamilton Sundstrand Corporation, Charlotte, NC (US)

(72) Inventor: Jacek F. Gieras, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 5 days.

(21) Appl. No.: 15/824,092

(22) Filed: Nov. 28, 2017

(65) Prior Publication Data

US 2019/0165661 A1    May 30, 2019

(51) Int. Cl.

| H02P 25/00 | (2006.01) |
| H03K 3/00 | (2006.01) |
| H02P 6/00 | (2016.01) |
| H02P 6/14 | (2016.01) |
| H02K 21/46 | (2006.01) |
| H02K 21/14 | (2006.01) |
| H02P 25/03 | (2016.01) |
| H02K 1/12 | (2006.01) |
| H02P 25/08 | (2016.01) |
| H02K 1/27 | (2006.01) |
| H02P 25/20 | (2006.01) |
| H02K 1/24 | (2006.01) |
| H02P 1/48 | (2006.01) |
| H02K 11/33 | (2016.01) |
| H02K 3/28 | (2006.01) |

(52) U.S. Cl.
CPC .............. *H02K 21/46* (2013.01); *H02K 1/12* (2013.01); *H02K 1/246* (2013.01); *H02K 1/2753* (2013.01); *H02K 1/2766* (2013.01); *H02K 21/14* (2013.01); *H02P 1/48* (2013.01); *H02P 25/03* (2016.02); *H02P 25/08* (2013.01); *H02P 25/20* (2013.01); *H02K 3/28* (2013.01); *H02K 11/33* (2016.01)

(58) Field of Classification Search
CPC ........................................................ H02K 21/46
USPC ...................................................... 318/400.41
See application file for complete search history.

(56) References Cited

U.S. PATENT DOCUMENTS

| 3,016,482 A | 1/1962 | Andersen et al. |
| 5,818,140 A | 10/1998 | Vagati |
| 6,239,526 B1 | 5/2001 | Oh et al. |

(Continued)

FOREIGN PATENT DOCUMENTS

| DE | 102015105138 | 10/2015 |
| KR | 101123676 | 3/2012 |

OTHER PUBLICATIONS

The Extended European Search Report for EP Application No. 18208927.6, dated Mar. 25, 2019.

(Continued)

*Primary Examiner* — Erick D Glass
(74) *Attorney, Agent, or Firm* — Carlson, Gaskey & Olds, P.C.

(57) ABSTRACT

An electric motor is disclosed that includes a stator winding defining a plurality of poles, with the winding being controllable to switch between a first number of poles and a second number of poles. A rotor rotatable within the stator includes a first group of magnetic flux barriers being without permanent magnet material and a second group of magnetic flux barriers at least partially filled with a permanent magnet material. A method of operating a line-start electric motor is also disclosed.

14 Claims, 1 Drawing Sheet

(56) References Cited

U.S. PATENT DOCUMENTS

| | | | |
|---|---|---|---|
| 6,815,859 B2 | 11/2004 | Sakuma et al. | |
| 6,844,652 B1 | 1/2005 | Chu et al. | |
| 7,806,991 B2 | 10/2010 | Komuro et al. | |
| 2003/0020351 A1 | 1/2003 | Lee et al. | |
| 2003/0146732 A1* | 8/2003 | Fei | H02K 17/06 |
| | | | 318/773 |
| 2005/0001504 A1* | 1/2005 | Chang | H02K 21/14 |
| | | | 310/156.53 |
| 2005/0163628 A1* | 7/2005 | Ionel | F04D 27/004 |
| | | | 417/374 |
| 2007/0132330 A1 | 6/2007 | Fei et al. | |
| 2008/0224558 A1* | 9/2008 | Ionel | H02K 1/2766 |
| | | | 310/156.57 |
| 2020/0091804 A1* | 3/2020 | Lee | H02K 1/246 |

OTHER PUBLICATIONS

Poudel Bikrant et al., Line start synchronous motor for multi-speed applications, IEEE International Electric Machines and Drives Conference (IEMDC), May 21, 2017, pp. 1-6.

Aliabad Aliakbar Damaki et al., Design and analysis of a two-speed line start synchronous motor: scheme one, IEEE Transactions on Energy Conversion, IEEE Service Center, Piscataway, NJ, Mar. 1, 2016, pp. 366-372, vol. 31, No.1.

* cited by examiner

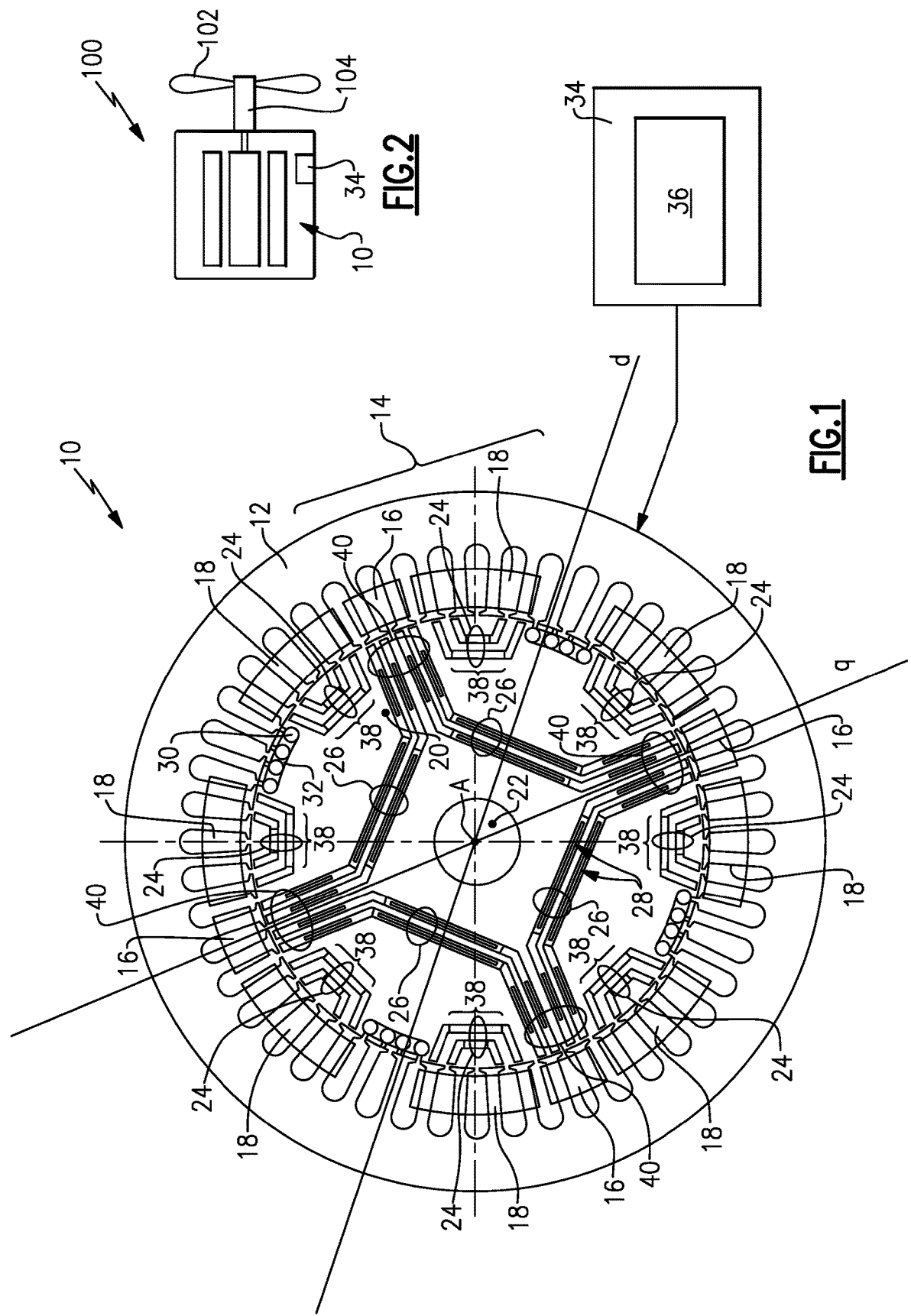

LINE START TWO-SPEED BRUSHLESS MOTOR

BACKGROUND

A line-start permanent magnet motor LSPM does not require a solid state inverter to operate at acceptable efficiencies and power factors. The rotor of a LSPM will reach a synchronous speed with a rotating magnetic field and maintain that speed. Accordingly, although the elimination of the solid state inverter reduces costs, it also means that the motor may only operate at a constant speed.

SUMMARY

An electric motor according to an exemplary embodiment of this disclosure, among other possible things includes a stator winding defining a plurality of poles, wherein the winding is controllable to switch between a first number of poles and a second number of poles. A rotor rotatable within the stator includes a first group of magnetic flux barriers being without permanent magnet material and a second group of magnetic flux barriers at least partially filled with a permanent magnet material.

A line-start electric motor according to another exemplary embodiment of this disclosure, among other possible things includes a stator including a first winding defining a first set of poles and a second winding including a second set of poles, a rotor including a first group of magnetic flux barriers defining a first group of poles and a second group of magnetic flux barriers at least partially filled with permanent magnet material and a controller for switching between the first winding to synchronize rotation with the first group of poles on the rotor and provide a first rotational speed and a second winding to synchronize with the second group of poles on the rotor to provide a second rotational speed.

A method of operating a line start electric motor according to another exemplary embodiment of this disclosure, among other possible things, includes selecting a first set of poles on a stator to generate a first rotating magnetic field with a controller, wherein the stator includes a first set of windings defining the first set of poles and a second set of winding defining a second set of poles, generating a reluctance torque in a first group of magnetic flux barriers disposed on a rotor at a first rotational speed, switching from the first winding to the second winding of the stator with the controller to stop the first rotating magnetic and generate a second rotating magnetic field in the stator and generating a permanent magnet torque in a second group of magnetic flux barriers including permanent magnet material on the rotor to rotate at a second rotational speed.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 1 is a schematic view of an example line start permanent magnet electric motor embodiment.

FIG. 2 is a schematic view of an example fan assembly including an electric motor according to an example embodiment.

DETAILED DESCRIPTION

Referring to FIG. 1, a line start permanent magnet brushless motor LSPMBM 10 is shown schematically and is operable at two speeds without the need of a solid-state inverter. The example motor 10 includes a rotor 20 including a set of permanent magnet poles 40 and a set of poles 38 without permanent magnet material.

The motor 10 includes a stator 12 with a winding 14 that may be selectively controlled to provide either four (4) or eight (8) poles. The example winding 14 is schematically shown and includes a first set of windings 18 and a second set of winding 16. The first set windings 18 define eight (8) poles evenly spaced about the inner periphery of the rotor 20. The second set of windings 16 includes four (4) poles disposed about the inner periphery of the rotor 20 and interspersed between the first set of windings 18. The example winding 14 can include two separate sets of windings as is disclosed by way of example and indicated at 16 and 18 or one winding that can be controlled as required to provide groups of four (4) or eight (8) poles.

A controller 34 with a switch 36 provides for control of the stator windings 16 and 18 and select between the first set of windings 18 and the second set of windings 16 to define the desired number of poles for operation of the motor 10.

A rotor 20 is disposed within the stator 12 and rotates about an axis A. The rotor 20 includes a first group of magnetic flux slots 24 and a second group of magnetic flux slots 26. The slots 24, 26 define magnetic flux barriers within the rotor 20. The second group of slots 26 are filled with a permanent magnet material 28. The first group of slots 24 is not filled with permanent magnet material.

The first group of slots 24 define eight (8) poles 38 within the rotor 20. The second group of slots 26 including the permanent magnet material 28 define four (4) poles 40 in the rotor 20. The first group of slots 24 without permanent magnet material create a reluctance torque in the rotor 20 in response to the controller 34 powering the first set of windings 18 including eight (8) poles.

The second set of slots 26 including the permanent magnet material 28 that defines the four (4) poles 40 generate a permanent magnet torque in response to the controller 34 powering the second set of windings 16.

The rotor 20 also includes groups of rotor slots 30 including cage windings 32. The rotor slots 30 and cage winding 32 provide for self-starting of the motor 10. Upon initial powering of the windings 14, the motor begins rotation as an induction motor. When the speed of the rotor 20 is close to a synchronous speed, the rotor 20 is pulled into synchronism and operates as the constant synchronous speed. The rotor cage windings 32 can be provided such that they extend radially inward toward the axis A to reduce possible braking torque. Moreover, the example slots 30 are disclosed with a round shape, however it should be understood that the rotor slots 30 could be different shapes and sizes within the contemplation of this disclosure.

The example motor 10 provides for operation at a first speed when the first set of windings 18 is actuated providing eight (8) poles on the stator 12. The first speed generated by the rotor 20 is accomplished through the creation of reluctance torque and the second speed is provided through the production of a permanent magnet torque. The electromagnetic torque produced by synchronous motors haves two components, permanent magnet torque and reluctance torque:

$$T_e = T_{PM} + T_{rel} \quad \text{(Equation 1)}$$

Torque produce by permanent magnets is:

$$T_{PM} = \frac{m_1}{2\pi n_s} \frac{E_f V_1}{X_{ds}} \sin\delta \quad \text{(Equation 2)}$$

Reluctance torque, i.e., torque produced due to difference in synchronous reactances in the d- and q-axis is:

$$T_{rel} = \frac{m_1}{2\pi n_z} \frac{V_1^2}{2}\left(\frac{1}{X_{zq}} - \frac{1}{X_{sd}}\right) \quad \text{(Equation 3)}$$

Where $m_1$ is the number of stator phases, usually $m_1=3$.
ns=f/p is the synchronous speed;
f is the input frequency;
p is the number of rotor pole pairs;
$V_1$ is the stator input voltage per phase;
$E_f$ is the EMF per phase induced in the stator winding by rotor PMs (field excitation);
$X_{sd}$ is the synchronous reactance in the d-axis,
$X_{sq}$ is the synchronous reactance in the q-axis; and
δ is the load angle between the EMF and voltage.

The d-axis is the center axis of the magnetic pole and the q-axis is the axis orthogonal to the d-axis.

The disclosed motor 10 includes the first set of slots 24 that provides eight (8) poles 38 without permanent magnets. The second set of slots 26 provide four (4) groups of poles 40 with permanent magnets 28. The eight (8) poles 38 without permanent magnets create a reluctance torque according to equation (3) and the four (4) poles 40 with permanent magnet material create permanent magnet torque according to equation (2). For the eight (8) poles 38 and 60 Hz power the synchronous speed is:

$n_s$=(60/4)×60=900 rpm

For the four (4) poles 40 and 60 Hz the synchronous speed is:

$n_s$=(60/2)×60=1800 rpm.

In the stator winding 14, the magnetic properties of permanent magnets are neutralized at low rotor speeds (in this case 900 rpm) and, therefore, do not interfere with motor performance. In other words, the reluctance nature of the rotor 20 becomes predominant at low rotor speeds. At high rotor speeds (in this case 1800 rpm) the reluctance nature of the rotor 20 is neutralized, and the motor 10 operates as a permanent magnet synchronous motor.

It should be understood that although the first set of windings in the stator and the rotor define eight (8) poles and the second set of windings and poles define four (4) poles. Other numbers of poles could be utilized to define different desired operating speeds. Moreover, the slots 24, 26 within the rotor 20 could be alternately shaped. For example, the slots could be C-shaped, V-shaped, and I-shaped or may have more complex shapes as is understood by those skilled in the art.

Accordingly, the disclosed example motor 10 is operable at both the first rotational speed and the second rotational speed by the controller 34 without an inverter.

Operation of the motor 10 begins by first selecting the first set of windings 18 with the controller 34 to generate a first rotating magnetic field that synchronizes with the first group of magnetic flux slots 24 on the rotor 20. Because the first group of flux slots 24 does not include permanent magnet material, the torque generated to rotate the rotor 20 is a reluctance torque. When it is desired to rotate the rotor 20 at a higher speed, the controller switches from the first winding 18 to the second winding 16. The second winding 16 generates a second rotating magnetic field that synchronizes with the second group of magnetic flux slots 26 including the permanent magnetic material 28. The rotor 20 is driven by a permanent magnet torque at the second rotational speed according to the synchronous speed equation as previously described. In the disclosed example motor 10, the second rotational speed is greater than the first rotational speed. The rotor 20 includes cage windings 32 disposed within rotor slots 30 that aid in starting rotation of the rotor 20 prior to the rotor attaining the first speed.

Referring to FIG. 2, the example motor 10 is utilized in a fan assembly 100 including a fan 102 driven by shaft 104 driven by the motor 10. The motor 10 operates at two speeds and can provide operation of the fan 102 for use as a blower for cooling or other purposes. The controller 34 switches the motor 10 between the first speed and the second speed as is necessary for operation of the fan assembly 100.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An electric motor comprising:
a stator including a winding defining a plurality of poles, wherein the winding is controllable to switch between a first number of poles and a second number of poles; and
a rotor rotatable within the stator, the rotor including a first group of magnetic flux barriers that define eight poles with each of the eight poles including two slots in the rotor being without permanent magnet material, a second group of magnetic flux barriers that define four poles including parts of four slots that are at least partially filled with a permanent magnet material and at least four groups of rotor slots that include cage windings disposed between at least two of the eight poles of the first group of magnetic flux barriers, wherein each of the four groups of rotor slots are disposed between at least two of the eight poles of the first group of magnetic flux barriers.

2. The electric motor as recited in claim 1, wherein the winding defines a first winding defining the first number of poles and a second winding defining the second number of poles.

3. The electric motor as recited in claim 2, wherein the first winding defines eight (8) poles and the second winding defines four (4) poles.

4. The electric motor as recited in claim 3, wherein the first group of magnetic flux barriers generate a reluctance torque in the rotor.

5. The electric motor as recited in claim 1, wherein the second group of magnetic flux barriers generate a permanent magnet torque.

6. The electric motor as recited in claim 1, wherein the first group of magnetic flux barriers and the second group of magnetic flux barriers each include a shape comprising one of a C-shape, a V-shape and an I-shape.

7. The electric motor as recited in claim 1, including a controller for switching the winding of the stator between the first number of poles to provide a first rotational speed of the rotor and the second number of poles to provide a second rotational speed.

8. The electric motor as recited in claim 7, including the controller for operation of the motor being without an inverter during operation of both the first rotational speed and the second rotational speed.

9. A line-start electric motor comprising:
a stator including a first winding defining a first set of poles and a second winding defining as second set of poles;
a rotor including a first group of magnetic flux barriers defining a first group of eight poles, a second group of magnetic flux barriers defining a second group of four poles and at least four groups of rotor slots that include cage winding disposed between two of the eight poles of the first group of magnetic flux barriers, the first group of magnetic flux barriers including at least two slots for each of the eight poles being without permanent magnet material and the second group of magnetic flux barriers including parts of at least four slots at least partially filled with permanent magnet material, wherein each of the at least four groups of rotor slots are disposed between at least two of the eight poles of the first group of magnetic flux barriers; and
a controller configured to switch between the first winding to synchronize rotation with the first group of poles on the rotor and provide a first rotational speed and the second winding to synchronize with the second group of poles on the rotor to provide a second rotational speed.

10. The electric motor as recited in claim 9, wherein the first set of poles defined by the first winding has eight (8) poles and the second set of poles defined by the second winding has four (4) poles.

11. The electric motor as recited in claim 10, wherein the first group of poles includes eight (8) poles on the rotor and the second group of poles includes four (4) poles on the rotor.

12. The electric motor as recited in claim 11, wherein the first rotational speed is less than the second rotational speed.

13. The electric motor as recited in claim 11, wherein the first group of magnetic flux barriers generate a reluctance torque in the rotor and the second group of magnetic flux barriers generate a permanent magnet torque.

14. The electric motor as recited in claim 9, including being operable at the first speed and the second speed without an inverter.

* * * * *